United States Patent
Stahl

(10) Patent No.: US 12,129,966 B2
(45) Date of Patent: Oct. 29, 2024

(54) METHOD FOR PRODUCING A BARRIER LAYER OF A PRESSURE VESSEL, AND PRESSURE VESSEL

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 245 days.

(21) Appl. No.: 17/593,916

(22) PCT Filed: Mar. 17, 2020

(86) PCT No.: PCT/EP2020/057173
§ 371 (c)(1),
(2) Date: Sep. 28, 2021

(87) PCT Pub. No.: WO2020/193262
PCT Pub. Date: Oct. 1, 2020

(65) Prior Publication Data
US 2022/0196207 A1    Jun. 23, 2022

(30) Foreign Application Priority Data
Mar. 28, 2019    (DE) .................... 10 2019 107 983.7

(51) Int. Cl.
*F17C 1/16*    (2006.01)
*F17C 1/02*    (2006.01)

(52) U.S. Cl.
CPC .................. *F17C 1/16* (2013.01); *F17C 1/02* (2013.01); *F17C 2201/0109* (2013.01); *F17C 2203/0604* (2013.01); *F17C 2203/0636* (2013.01); *F17C 2203/066* (2013.01); *F17C 2203/0663* (2013.01); *F17C 2203/0695* (2013.01); *F17C 2221/033* (2013.01); *F17C 2270/0168* (2013.01)

(58) Field of Classification Search
USPC ................ 220/588; 427/238; 419/48, 66, 68
See application file for complete search history.

(56) References Cited

U.S. PATENT DOCUMENTS 8,220,130 B2 *    7/2012    Robbins .............. B65D 90/022
                                                                            29/260
9,011,622 B2 *    4/2015    Radtke ..................... F17C 1/06
                                                                            156/173
(Continued)

FOREIGN PATENT DOCUMENTS

CN    1745273 A    3/2006
CN    102168756 A    8/2011
(Continued)

OTHER PUBLICATIONS

English Machine Translation of KR-20150104384-A (Year: 2015).*
(Continued)

*Primary Examiner* — Nathan J Jenness
*Assistant Examiner* — Laura E. Parker
(74) *Attorney, Agent, or Firm* — Crowell & Moring LLP

(57) ABSTRACT

A method of producing a barrier layer of a pressure vessel includes applying the barrier layer to a liner and/or to a fiber-reinforced layer of the pressure vessel while a pressure difference between the internal volume and the surroundings of the pressure vessel is being maintained.

14 Claims, 1 Drawing Sheet

(56) References Cited

U.S. PATENT DOCUMENTS

| | | | |
|---|---|---|---|
| 2002/0088806 A1* | 7/2002 | Takaku | F17C 1/16 |
| | | | 220/589 |
| 2006/0065664 A1* | 3/2006 | Ohta | B29C 70/56 |
| | | | 220/588 |
| 2010/0068561 A1 | 3/2010 | Rohwer et al. | |
| 2010/0075200 A1 | 3/2010 | Hatta | |
| 2010/0304063 A1* | 12/2010 | McCrea | C08J 7/123 |
| | | | 428/35.8 |
| 2011/0210127 A1 | 9/2011 | Strack et al. | |
| 2014/0008373 A1 | 1/2014 | Sharp et al. | |
| 2017/0261159 A1 | 9/2017 | Stahl et al. | |
| 2017/0268724 A1 | 9/2017 | Kanezaki et al. | |
| 2017/0297259 A1 | 10/2017 | Otsubo et al. | |
| 2018/0048001 A1 | 2/2018 | Yanagisawa et al. | |
| 2020/0182404 A1* | 6/2020 | Sawai | F17C 1/16 |

FOREIGN PATENT DOCUMENTS

| | | | |
|---|---|---|---|
| CN | 106852167 A | 6/2017 | |
| CN | 107429877 A | 12/2017 | |
| DE | 35 29 870 A1 | 2/1987 | |
| DE | 10 2009 040 798 A1 | 5/2010 | |
| DE | 10 2009 042 401 A1 | 5/2010 | |
| DE | 10 2011 011 838 A1 | 3/2012 | |
| DE | 10 2015 204 624 A1 | 9/2016 | |
| DE | 10 2015 225 348 A1 | 6/2017 | |
| DE | 10 2017 108 043 A1 | 10/2017 | |
| KR | 20150104384 A * | 9/2015 | |
| WO | WO-2013026140 A1 * | 2/2013 | B60P 3/2205 |

OTHER PUBLICATIONS

English Machine Translation of KR-20150104384 from Espacenet (Year: 2015).*

International Search Report (PCT/ISA/210) issued in PCT Application No. PCT/EP2020/057173 dated May 27, 2020 with English translation (six (6) pages).

German-language Written Opinion (PCT/ISA/237) issued in PCT Application No. PCT/EP2020/057173 dated May 27, 2020 (seven (7) pages).

German-language Search Report issued in German Application No. 10 2019 107 983.7 dated Dec. 4, 2019 with a partial English translation (13 pages).

Chinese-language Office Action issued in Chinese Application No. 202080021379.8 dated Jul. 5, 2022 with English translation (15 pages).

* cited by examiner

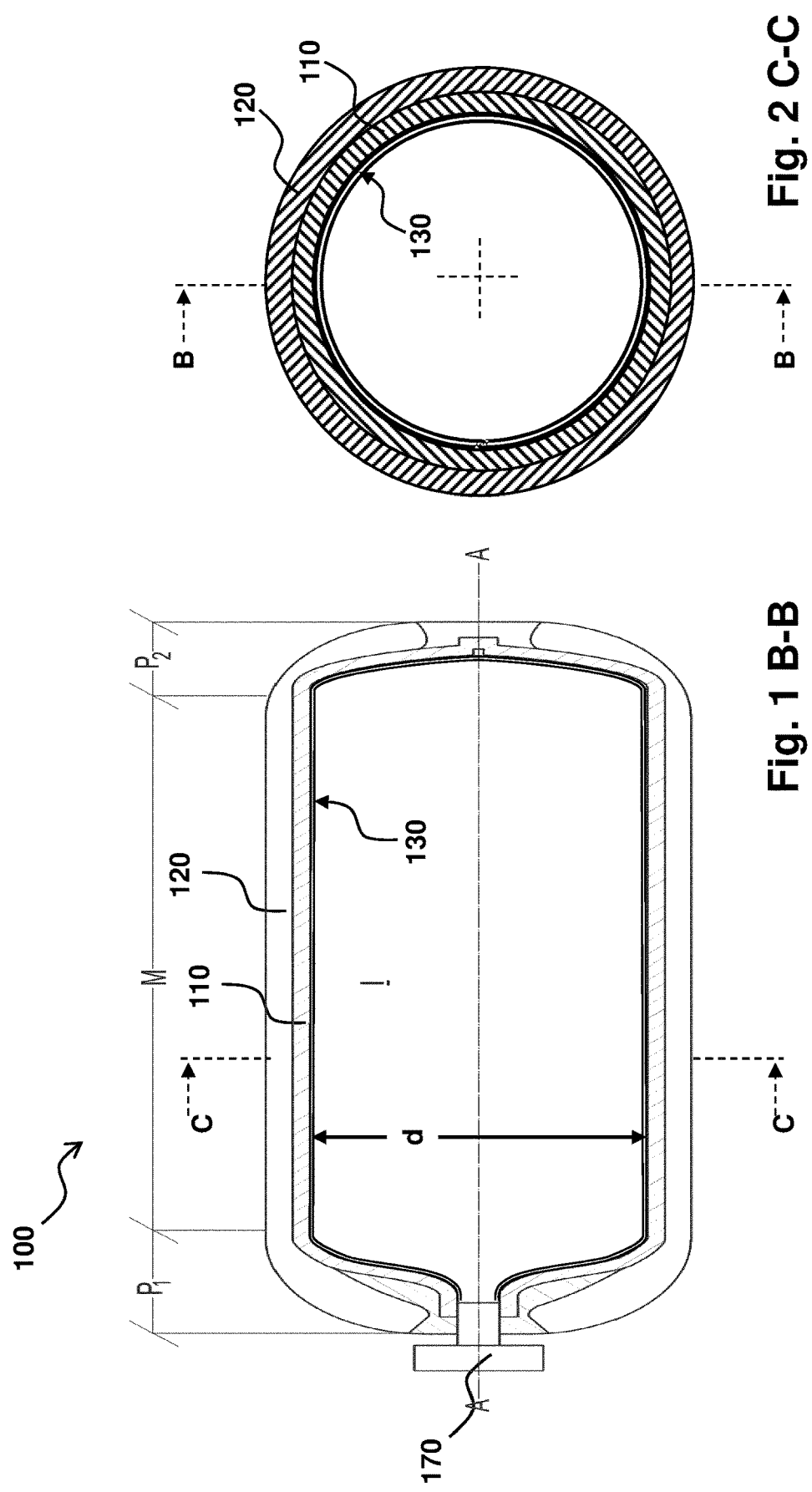

METHOD FOR PRODUCING A BARRIER LAYER OF A PRESSURE VESSEL, AND PRESSURE VESSEL

BACKGROUND AND SUMMARY OF THE INVENTION

The technology disclosed herein relates to a method for the production of a barrier layer of a pressure vessel, and also to a pressure vessel.

Pressure vessels for the storage of fuel which is gaseous under ambient conditions are known. The prior art moreover discloses methods for the chemical or electro-chemical production of metal coatings. It is also known that metal coatings can be used as permeation barriers, for example in order to reduce the permeation of hydrogen. When a metal coating of this type is applied on the external side of the pressure vessel, accumulation of hydrogen under the coating could cause breakaway of the layer. Fractures could moreover reduce the effect of the metal layer in respect of the permeation. Such fractures could by way of example be caused by functionally-determined expansion of the pressure vessel.

A preferred object of the technology disclosed herein is to reduce or to eliminate at least one disadvantage of a previously disclosed solution, or to propose an alternative solution. A preferred object of the technology disclosed herein is in particular to improve the barrier layer of a pressure vessel, and also to improve production of the barrier layer. Other preferred objects can derive from the advantageous effects of the technology disclosed herein. The object(s) is/are achieved via the subject matter of the independent claims. The dependent claims present preferred embodiments.

The technology disclosed herein relates to a pressure vessel for a motor vehicle (e.g. cars, motorcycles, commercial vehicles). The pressure vessel serves for the storage, in an internal volume of the pressure vessel, of fuel which is gaseous under ambient conditions. The pressure vessel can by way of example be used in a motor vehicle which is operated with compressed natural gas ("Compressed Natural Gas"=CNG) or liquefied natural gas (LNG) or with hydrogen.

This type of pressure vessel is also termed composite overwrapped pressure vessel (=COPV). The pressure vessel can by way of example be a cryogenic pressure vessel or a high-pressure-gas vessel.

High-pressure-gas vessels are configured to store fuel over a prolonged period at ambient temperatures at a nominal operating pressure (also termed nominal working pressure or NWP) of about 350 bar gauge pressure (=pressure in excess of atmospheric pressure), more preferably about 700 bar gauge pressure or more. A cryogenic pressure vessel is also suitable for storage of the fuel at the abovementioned operating pressures at temperatures significantly below the operating temperature of the motor vehicle.

This type of pressure vessel can by way of example be configured from a tubular storage system which has a plurality of storage tubes which respectively have a length-to-diameter ratio with a value between 5 and 40, preferably between 7 and 25, and particularly preferably between 9 and 15. The length-to-diameter ratio is the quotient calculated from the length of the storage tube in the numerator and the external diameter of the storage tube in the denominator. The storage tubes are advantageously arranged parallel to one another and/or have connection to one another at their ends in a manner that permits flow of fluid. The storage tubes are typically connected in series, and can advantageously have been produced in a continuous manufacturing process. Between the storage tubes there can be connecting elements provided that permit flow of fluid. Connecting elements permitting flow of fluid between the storage tubes also permit connection in parallel and/or combinations of connection in parallel and in series.

The pressure vessel can comprise a liner. The liner forms the hollow body or the internal volume in which the fuel is stored. The liner is preferably a plastics liner produced from a plastic. It is equally also possible to provide a pressure vessel with no liner.

The pressure vessel comprises at least one fiber-reinforced layer. The fiber-reinforced layer can surround a liner at least in some regions, preferably completely. The fiber-reinforced layer is often also termed laminate or jacket or reinforcement. The expression "fiber-reinforced layer" is mostly used hereinafter. The following can generally be used as fiber-reinforced layer: fiber-reinforced plastics (=FRP or FPR or carbon fibre reinforced plastics or CFRP), for example carbon-fiber-reinforced plastics (=CFP) and/or glassfiber-reinforced plastics (=GFP). The fiber-reinforced layer advantageously comprises reinforcement fibers embedded in a plastics matrix. In particular, matrix material, type and content of reinforcement fibers, and also their orientation, can be varied in a manner that establishes the desired mechanical and/or chemical properties. It is preferable to use continuous fibers as reinforcement fibers; these can be applied by winding and/or braiding. The fiber-reinforced layer generally has a plurality of plies within the layer.

The pressure vessel comprises at least one barrier layer. The barrier layer serves for the reduction, and preferably for the avoidance, of fuel-permeation. The barrier layer is therefore equipped at least to reduce, and preferably in essence entirely to prevent, the escape of fuel stored in the internal volume into the pressure-vessel wall and/or to the surroundings. By way of example, the barrier layer can be equipped specifically to inhibit diffusion, this being one of the three subsidiary steps that determine permeation: sorption, diffusion and desorption. To this end, the barrier layer can provide a minimized free volume, i.e. by way of example in the case of polymers only little free space between the molecular chains. As a general rule, diffusion is inhibited by a high filler content or a high crystallinity of a thermoplastic, and by a high degree of crosslinking in the case of elastomers and thermosets. The barrier layer advantageously surrounds at least 70% or at least 90% or at least 99% of the internal volume. A surface coating can advantageously form the barrier layer. The barrier layer can be configured as metal layer, in particular made of aluminum, steel and/or copper, or else of alloys of these. Alternatively, the barrier layer can have been produced from a fuel-barrier plastic, e.g. ethylene-vinyl alcohol copolymer (EVOH). The thickness of the barrier layer is preferably about 0.001 mm to 0.2 mm and particularly preferably between about 0.005 mm and 0.1 mm.

The barrier layer can by way of example have the same coefficient of thermal expansion as the liner and/or the fiber-reinforced layer. The barrier layer can be in direct or indirect contact with the liner and, respectively, with the fiber-reinforced layer on the internal side or the external side. The barrier layer can particularly preferably have been provided internally relative to the fiber-reinforced layer and/or relative to the liner. An adhesion-promoting layer (also termed primer) can advantageously have been provided between the barrier layer and the liner and, respectively, the fiber-reinforced layer.

It is advantageous that in the not-internally-pressurized state of the pressure vessel the barrier layer is under compression in axial direction Z of the pressure vessel and/or in circumferential direction U of the pressure vessel. In other words, in the not-internally-pressurized state the barrier layer is subject to compressive stress in axial direction Z of the pressure vessel and/or in circumferential direction U of the pressure vessel. The not-internally-pressurized state is the state in which the internal pressure of the pressure vessel corresponds in essence to the ambient pressure or atmospheric pressure.

The barrier layer can be equipped to undergo change from the state of compression (in particular in axial direction and, respectively, in circumferential direction) to a state of expansion in the event that the pressure in the internal volume exceeds an internal pressure threshold of the pressure vessel, where the internal pressure threshold has a value within 1% to 150% of the nominal operating pressure of the pressure vessel (100), or 20% to 140% of the nominal operating pressure of the pressure vessel (100), or 50% to 130% of the nominal operating pressure of the pressure vessel (100).

The barrier layer can suppress permeation more successfully in the compressed state than in the expanded state. The barrier effect can thus be improved. The probability of fracturing is moreover reduced.

The technology disclosed moreover provides a method for the production of a barrier layer of a (or of the herein-disclosed) pressure vessel with an internal volume, comprising the step according to which a barrier layer intended to reduce fuel permeation is applied to a liner and/or to a fiber-reinforced layer while there is a pressure difference between the internal volume and the surroundings of the liner and, respectively, of the fiber-reinforced layer and, respectively, of the pressure vessel.

The barrier layer can be applied by any suitable coating method, for example by an electrical method, an electrochemical method and/or an electroplating method. The barrier layer can advantageously be produced by chemical gas-phase deposition (chemical vapor deposition, CVD) or by physical gas-phase deposition (physical vapor deposition, PVD).

The pressure difference can advantageously amount to at least 1% of the nominal operating pressure of the pressure vessel (100), or at least 10% or at least 20% or at least 30% or at least 40%, at least 50% or at least 60% or at least 70% or at least 80% or at least 90% or at least 100% or at least 110% or at least 130% or at least 150%. Selection of the pressure difference can advantageously be such that it leads to at least 10% of the expansion that the surface to be coated would undergo on exposure to the nominal operating pressure of the pressure vessel (100), or at least 50% or at least 125%. The pressure difference can moreover be at least 10% of the bursting pressure of the plastics liner (100), or at least 20% or at least 30% or at least 40%, at least 50% or at least 60% or at least 70% or at least 80% or at least 90%.

It is thus possible to achieve particularly easy, rapid and inexpensive production of the barrier layer which, in the not-internally-pressurized state of the pressure vessel, is under compression in axial direction and/or in circumferential direction.

It is moreover possible that during the production process in the case of an internal barrier layer the material of the barrier layer is pressed into any pores or interstices that may be present in the liner or in the fiber-reinforced layer, thus further increasing the barrier effect.

According to the technology disclosed herein, the method can comprise the step according to which the barrier layer is provided internally relative to the fiber-reinforced layer and/or relative to the liner. It is particularly preferable that the barrier layer is applied to a plastics liner, or else directly to the fiber-reinforced layer. It is advantageously possible that an adhesion-promoting layer (also termed primer) is provided between the barrier layer and the liner or the fiber-reinforced layer.

In particular, the technology disclosed herein provides a pressure vessel and, respectively, liner for the storage of fuel which is gaseous under ambient conditions; this has been produced by one of the methods disclosed herein.

In other words, the technology disclosed herein provides a method for the production of a permeation-barrier layer. If the coating is applied while the pressure vessel is greatly expanded, because it is under high internal pressure, there is then less fracturing or stretching of the metal lattice. The permeation-barrier effect is advantageously significantly improved. Chemical and/or electrochemical deposition of a metal layer can advantageously take place on the internal area of the vessel while the vessel is in the expanded state. To this end, the fluid present within the vessel during the coating procedure can be maintained at a pressure higher than the ambient pressure of the vessel. A liner can also be coated in this way. If this is done before the reinforcement has been applied, it is advantageous that only a relatively small internal pressure is needed to bring about a sufficiently great expansion during the coating procedure. At pressures smaller than the pressure (="original pressure") at which it was applied, the resultant layer is in a laterally compressed state. When the internal pressure is smaller than the original pressure during the production of the coating, for example when the vessel is unpressurized, a state of pressure exists in circumferential direction U and axial direction Z in the layer. Another advantage is that fractures which can open as a result of the internal pressure can then be filled and, as it were, sealed by the coating. If, instead, deposition is effected in accordance with the prior art, without internal pressure, fractures could arise (or open) under pressure which cause the coating to break apart.

The technology disclosed herein will now be explained with reference to the figures.

BRIEF DESCRIPTION OF THE DRAWINGS

FIG. 1 is a diagrammatic longitudinal sectional view of a pressure vessel 100 in accordance with the present invention, along the section line B-B of FIG. 2, and FIG. 2 is a diagrammatic cross-sectional view of the pressure vessel 100 of FIG. 1, along the section line C-C of FIG. 1.

DETAILED DESCRIPTION

FIG. 1 shows a pressure vessel 100 according to the technology disclosed herein. The pressure vessel 100 comprises a plastics liner 110 (for which the term liner is also generally used herein), surrounded by a fiber-reinforced layer 120, also termed reinforcement. Provided here coaxially in relation to the longitudinal axis A-A of the pressure vessel is a pressure-vessel outlet in which the tank valve 170 has been inserted. In a central region M, the pressure vessel 100 comprises a cylindrical curved surface, at the two edges of which there is in each case a cap-shaped end P1, P2 provided. The pressure vessel 100 here is configured cylindrically. However, this is not an essential requirement. Other shapes are equally conceivable. Provided here on the internal side of the liner 110 is the barrier layer 130. The term permeation-barrier layer could also be used for the barrier layer 130. The barrier layer 130 and, respectively, the liner 110 surround the internal volume I of the pressure vessel 100 here; that volume serves for the storage of fuel. The barrier layer 130 here is configured from metal. It is equally conceivable that the barrier layer 130 has been produced from another material. Only one barrier layer 130 is shown here. It is equally conceivable that there are a plurality of barrier layers 130 provided, on top of one another or at various locations within the pressure vessel 100. It is equally conceivable that the barrier layer 130 has not been applied internally, but instead has been applied within the pressure-vessel wall (e.g. outside the plastics liner 110) or on the external surface of the pressure vessel 100 (e.g. on the external surface of the fiber-reinforced layer 120).

The internal diameter d of the liner 110 is moreover shown. If the internal volume I is now subjected to pressure during the production of the barrier layer 130, the liner 110 then expands (not shown here) and the internal diameter d increases. In this expanded state, the barrier layer 130 is now applied. Once the barrier layer 130 has been applied, the internal pressure is in turn reduced. The internal diameter d is therefore also reduced, and the barrier layer 130 is compressed. In a preferred embodiment, the barrier layer 130 is applied before the fiber-reinforced layer 120 is provided on the liner 110.

The barrier layer 130, which in the unpressurized state is compressed, can advantageously be produced at low internal pressures.

FIG. 2 shows a cross section through the pressure vessel 100 with the internal barrier layer 130, which here adheres to the liner 110 by way of an adhesion-promoting primer (not shown).

The preceding description of the present invention serves merely for illustrative purposes, and not for the purpose of restriction of the invention. For the purposes of the invention, various changes and modifications are possible without exceeding the scope of the invention and its equivalents.

What is claimed is:

1. A method for the production of a barrier layer of a pressure vessel having an internal volume, comprising the steps of:
   generating a pressure difference between the internal volume and an exterior surrounding of the pressure vessel; and
   applying the barrier layer to an interior surface of the pressure vessel while the pressure difference is being maintained such that the barrier layer is under compression in one or both of an axial direction and a circumferential direction when the pressure vessel is not pressurized.

2. The method according to claim 1, wherein the pressure difference is at least 10% of a nominal operating pressure of the pressure vessel.

3. The method according to claim 1, wherein the pressure difference is maintained at a predetermined pressure level that results in at least 10% expansion of the surface to which the barrier layer is being applied relative to an amount of expansion the pressure vessel would undergo when exposed to the nominal operating pressure of the pressure vessel.

4. The method according to claim 3, wherein the barrier layer is provided internally relative to one or both of a fiber-reinforced layer and a liner of the pressure vessel.

5. The method according to claim 3, wherein the barrier layer is applied to a plastics liner of the pressure vessel.

6. The method according to claim 5, wherein the pressure difference is at least 10% of a bursting pressure of the plastics liner.

7. The method according to claim 1, wherein the barrier layer is a metal layer.

8. A pressure vessel for the storage of fuel which is gaseous under ambient conditions, comprising a barrier layer produced according to the method of claim 1.

9. The pressure vessel according to claim 8, wherein the barrier layer is configured to undergo a change from a state of compression in the circumferential and axial directions to a state of expansion when pressure in the internal volume is greater than a predetermined internal pressure threshold, the predetermined internal pressure threshold having a value within 1% to 150% of the nominal operating pressure of the pressure vessel.

10. The pressure vessel according to claim 9, wherein the predetermined internal pressure threshold having a value within 20% to 140% of the nominal operating pressure of the pressure vessel.

11. The pressure vessel according to claim 9, wherein the predetermined internal pressure threshold having a value within 50% to 130% of the nominal operating pressure of the pressure vessel.

12. The pressure vessel according to claim 8, wherein the barrier layer is arranged internally relative to one or both of a fiber-reinforced layer and a liner of the pressure vessel.

13. The pressure vessel according to claim 8, wherein the barrier layer is applied to a plastics liner of the pressure vessel.

14. The pressure vessel according to claim 8, wherein the barrier layer is a metal layer.

* * * * *